July 4, 1933.  L. E. SHAW  1,916,495
METHOD OF MOLDING
Filed Sept. 22, 1928  2 Sheets-Sheet 1

Louis E. Shaw
INVENTOR

BY
Cavanagh & James
ATTORNEYS

July 4, 1933. L. E. SHAW 1,916,495
METHOD OF MOLDING
Filed Sept. 22, 1928 2 Sheets-Sheet 2

Louis E. Shaw
INVENTOR
BY Cavanagh & James
ATTORNEYS

Patented July 4, 1933

1,916,495

UNITED STATES PATENT OFFICE

LOUIS E. SHAW, OF EAST ORANGE, NEW JERSEY, ASSIGNOR TO JOHN STOGDELL STOKES, OF SPRING VALLEY FARMS, PENNSYLVANIA

METHOD OF MOLDING

Application filed September 22, 1928. Serial No. 307,606.

The present invention relates to a method of molding plastic materials of predetermined shape and form under hydrostatic pressure.

More particularly my invention comprises a method of molding potentially reactive infusibly thermosetting resinous materials, consisting essentially of subjecting a mass of plastic moldable material contained in a primary cavity or pressure chamber to heat for the purpose of rendering it plastic; and to pressure for the purpose of forcing the plastic material into a secondary or mold cavity through a passage or passages of relatively small cross-sectional area wherein the material is more uniformly heated.

An object of the method is to insure the material being in a highly plastic state when it enters the secondary or mold cavity in order that it may flow freely into all the interstices thereof.

A further object of the method is to heat the material to a temperature closely approaching that at which chemical reaction may take place for the purpose of hastening the forming and conversion of a potentially reactive plastic mass into a substantially set and hardened form.

I further provide in my method a mold cavity or cavities which may be closed to the final dimensions of the part to be molded or formed prior to the introduction of the molding material therein, to insure greater dimensional accuracy of the molded parts; a positive hydrostatic pressure on the molding material within the mold cavity, and a freedom from undesired fins.

I also provide in my method a common reservoir or source of plastic material having a capacity at least sufficient to properly simultaneously fill a desired number of mold cavities.

The reservoir, or pressure chamber, is provided with a relatively close fitting plunger for the purpose of exerting a predetermined and positive pressure on the material within the reservoir and, through the medium of the material itself, a predetermined hydrostatic pressure within the mold cavity or cavities as the case may be.

As it is usually desirable to remove any excess or obstructing material from the reservoir and communicating passages or ports leading to the mold, because such material tends to react to its infusible permanently set state I have provided simple and positive means for doing this.

With the above recited objects and others of a similar nature in view my invention consists in the method steps and their relation one to the other as set forth in and falling within the scope of the appended claims.

In order that my invention may be better understood a description of the accompanying drawings is given.

In the accompanying drawings

Figure 1:
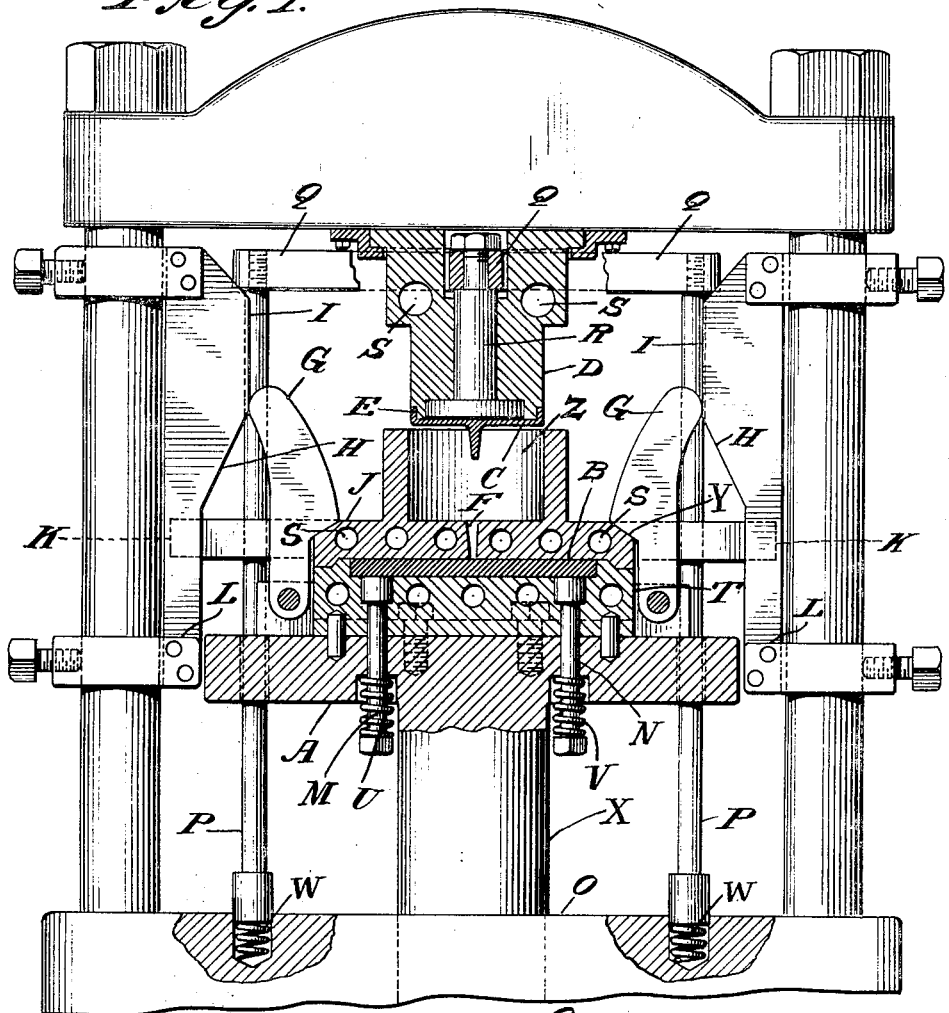
Fig. 1 is an elevation partly in section showing one form of apparatus suitable for my purpose and illustrating the operation of molding a piece after the piece has been molded but before being ejected from the mold.

In Fig. 1, I have illustrated the position of the apparatus after the molding operation has been completed and the platen A of a suitable press has started on its downward movement. The molded piece B is shown filling the molding cavity, and the excess material C is shown clinging to the plunger D, due to its shrinking on the cylindrical undercut portion E of the plunger. The excess material filling the gate or passage F has readily broken off without injury to the molded piece B because of the weak thin cross-section of material formed in the passage F. As the platen moves downward from the position shown the locking member G will be released by reason of the incline H of cam I. The top member J of the mold is provided with lateral bifurcated arms K which will next abut against the stops L holding the member J from further descent and forcing the locking member G outward because of the inclined surface Y.

During the very last of the platens downward movement the knockouts M and N will strike against the base of the press O and their upper ends will force the molded piece B out of the mold cavity. Simultaneously knockout rods P will be forced downward by the platen and by means of bar Q will cause knockout R to move downward stripping the excess material C from off the plunger D.

The three mold members T, J and D have passages S cored or drilled therein, indicating a means for heating, as through the circulation of steam.

After the platen has reached its lowest point and the molded piece and the excess material have been removed, it will be raised far enough to allow the knockouts M and N to drop into their lowest positions and knockout R to be raised to its highest position, this movement being caused by the springs U, V and W respectively.

The press is now in position for the reception of another quantity of molding material which is placed in the pressure chamber Z and the upward movement of the platen continued. As the platen moves upward it will first lift the top of the mold J away from the abutments L, and the locking members G will then be forced inward by the faces H of the cams. Further upward movement of the platen places the material in the pressure chamber under the predetermined pressure desired while, at the same time, the application of heat as illustrated by the openings S, will cause the material to soften first along the contacting metallic surfaces of the plunger D and the reservoir J and flow will ensue from such surfaces through the passage F carrying with it more or less ununiformly softened or heated material which will all be uniformly heated to a relatively high temperature and plasticity because of the narrow cross-section of the passage F and its close proximity to a source of heat, as indicated by S. This uniform heating of the plastic material is very desirable for my purpose as it enables me to mold with exactitude the most intricate ornamentation and shape. Furthermore, where a potentially reactive molding plastic is used this uniform heating to a high temperature may be carried to the point where reaction is about to take place or is actually initiated, and under these conditions such plastic material is forced into the mold cavity requiring only a minimum of time to complete the final hard, set and molded product. Under these conditions the molded piece B is formed with great exactitude as to dimensions with a minimum amount of fins and under a uniform and positively controlled hydrostatic pressure. The pressure may now be released under the ram X, the platen allowed to descend, repeating the cycle above described.

It is to be understood that in cases where the combined weight of the platen, ram and mold are not sufficient to overcome the friction of the plunger D within the pressure chamber X that small "pull-back" rams may be employed. These are not shown on the drawings as this arrangement of rams is well understood in the art.

Figure 2:
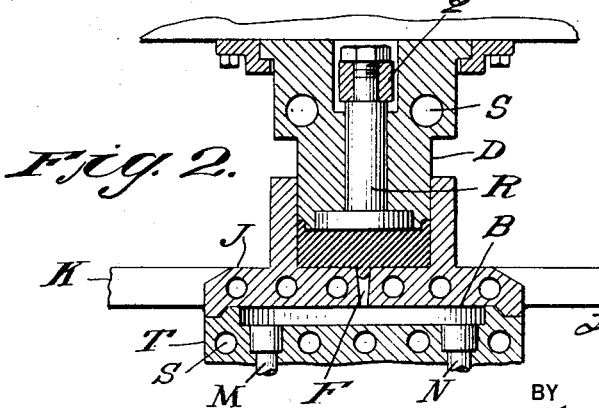
Fig. 2 is a more detailed view of Fig. 1 but illustrating the material in the cylinder or reservoir prior to the forcing of the material into the mold cavity.

In Fig. 2 I illustrate to better advantage the condition of the molding cycle prior to the material entering the mold cavity forming the piece B. This view illustrates very clearly the heating obtained from the surfaces of J and D which causes the partially heated material to flow toward the passage F. The material in this condition is readily heated to a more uniform and higher degree because of the narrowness of this passage F and because of the high temperature to which the surfaces of this passage are heated.

Figure 3:
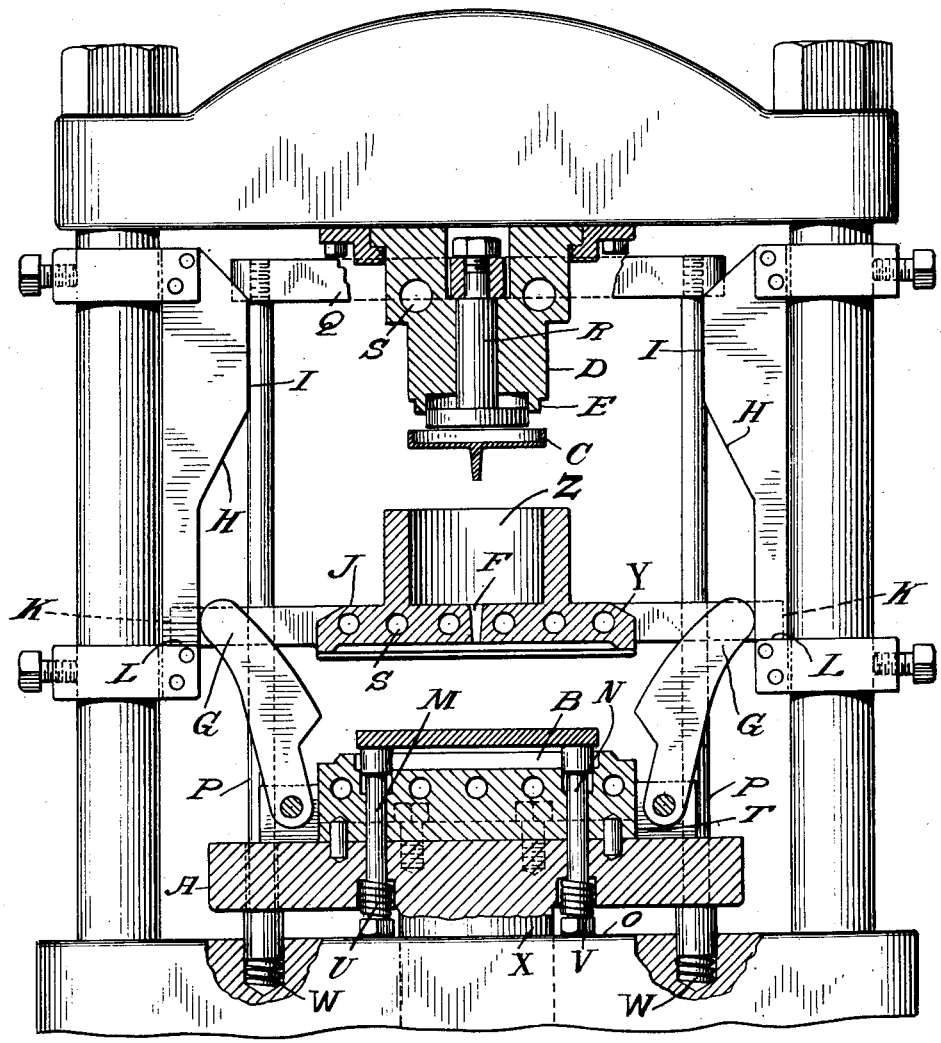
Fig. 3 is a view similar to Fig. 1 showing the ejection of the molded piece and the excess material from the plunger of the reservoir.

In Fig. 3 I show the molded piece B being ejected from the mold cavity by means of ejectors M and N. Also I show the ejection of the surplus material formed within the pressure chamber J and the passage F. It will be noted that the excess material C has been broken from the molded piece B and has been removed from the pressure chamber J, due to the shrinkage of the material on to the cylindrical undercut portion E. The excess material C is ejected from the plunger D by means of the ejector R. Material so ejected can be used over again as a filler by being pulverized and mixed with other fresh material or by being re-fabricated for use in any other suitable manner. After a number of trials it is possible to reduce the excess material C to the very minimum limits and it will be found from actual practice that there will be far less waste of material from this source than is ordinarily wasted because of the excess overflow or fins, due to the old processes of molding as at present practiced in the art.

Referring again to the drawings, it should be understood that while I have shown the knockouts M and N as projecting through the lower platen of the press, for the sake of simplicity in illustrating one form of my invention, it is usual to mount these knockouts or ejectors on bars passing through grooves or slots in the lower member J of the mold in a manner similar to the bar Q used for the knockout in the plunger. Under this method of construction these bars in turn would be operated by knockouts similar to M and N passing through the press platen or by striking against abutments such as L.

It is also to be understood that other forms of locking members may be employed such as manually operated bolts, wedges, etc., or that to fit into the illustrated example given herein, a toggle joint operated by a lever striking against an adjustable stop in place of cam I, can be used, or that separate rams may be employed for holding the molds closed and for operating the plunger D. It should be noted in this connection that whenever the area of the molding cavity or the combined area of the cavities in case of a multi-cavity mold, is less than the area of the plunger D, it will not be necessary to hold the mold together by external means provided that the cavity J is so disposed with reference to the mold as to exert a pressure thereupon during the operation of the plunger D. The law of hydrostatics in this case would govern such matters. It might be mentioned here that outside of small frictional losses, a uniform hydrostatic pressure developed in cavity J will be transmitted to the molded piece B regardless of the relative areas of the piece B and plunger D, provided, of course, that the mold is suitably locked to prevent the escape of the material from the mold cavity, either by external means such as described above, or by utilizing the pressure of the plunger in cases where the area of the mold cavity B is less than that of the plunger itself.

Where I have shown the piece B being formed in a cavity depressed within the mold member T and inclosed by the lower surface of the mold member J, it is to be understood that these mold members T and J could merely be the platens of a suitable hydraulic press, or could be bed plates mounted upon suitable hydraulic press platens, and that these members T and J could be provided with suitable clamping devices or recesses to hold securely mold-forming members, the mold cavities being formed in the latter.

It is also to be understood that the mold member J may be heated to only a sufficient amount to cause the required movement of partially softened plastic material into the passage F wherein the material is heated to a higher temperature, or heating to a higher temperature may be cause to take place in the mold cavity B, and reaction will thereupon ensue.

Figure 4:
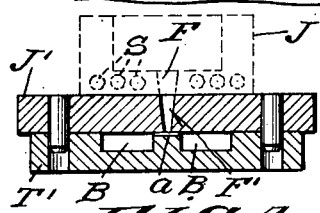
Fig. 4 is a vertical section of a mold illustrating how a multiplicity of mold cavities may be supplied with material through a single passage.

In Fig. 4, I illustrate the application of my method to the use of so-called hand molds in which the mold members J′ and T′ are not directly heated by means of the circulation of steam or water through passages therein but by contact with the heated or cooled platens of a press.

This figure also illustrates how a multiplicity of mold cavities may be supplied with material through a single passage F′ and the distributing channel or channels a.

In adapting this type of mold to use with my molding method it is only necessary to form therein a passage and channels required for receiving and distributing the material from the pressure chamber J which, in this instance, may be a separate member common to any number of molds.

The pressure chamber J of Fig. 4 may be heated, as required, through the medium of fluids circulated through the passage S, or by other suitable means, as previously described. It is frequently found sufficient to make the chamber J of a mass great enough to store the heat required for rendering the molding material therein plastic by first allowing it to absorb heat from a steam plate or oven; or the heat may be conducted to the material within the chamber through the body of the plunger (not shown) and the mold members T′ and J′, the plunger and the mold member T′ being in direct contact with the heated platens of the press in which the mold is used.

The pressure chamber J of Fig. 4 may be permanently mounted in the press after the manner of Figs. 1 and 3 and any number of molds used therewith successively. It will be understood that suitable means will be provided for so positioning the various molds that passages F and F′ will register correctly one with the other.

Figure 5:
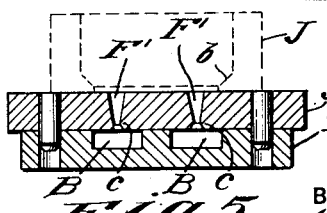
Fig. 5 is a view similar to Fig. 4 but showing how one or more mold cavities may be supplied with material through a multiplicity of passages.

In Fig. 5, I illustrate a form of pressure chamber J adapted for interchangeable use with molds of the so-called hand type in which a plurality of passages F′ are necessary, either for the supplying of a large number of small mold cavities B, or to supply a single mold cavity of large volume. In this instance, the pressure chamber is made bottomless except for the inwardly extending flange b which provides a bearing area for receiving a portion of the hydrostatic pressure generated by the plunger and is consequently held in firm contact with the mold member J′. With this form of pressure chamber the plunger is made to conform roughly to the interior shape of the chamber itself, in order that virtually all of the molding material may be expelled therefrom.

To insure the excess material breaking away from the molded piece, at a point exterior to the surface thereof, the passages F′ are countersunk at their outlet end, thus forming a clearly defined line of restriction at c. Due to this being the smallest area the material will naturally rupture at this point, leaving a small frusto-conical projection on the molded piece which may be readily smoothed off without detriment to the appearance of the latter.

The excess material within the passage F′ above the line of restriction c will remain integral with that portion clinging to the plunger, as previously described, while the material within the passage below the line c will remain attached to the molded piece. The passage F′ will therefore be cleaned automatically of all material during each cycle.

In my method of molding by hydrostatic pressure I find it at times highly desirable to mold or form objects containing relatively long and coarse fibrous filling materials such as, for example, spinable fibres of cotton, linen, hemp, sisal, etc., or the use of various other filling materials, such as, for example, wood shavings, coarse sawdust, comminuted paper or pulp, and as these materials may be too coarse to feed through the passage to the secondary pressure chamber forming the mold cavity, it is desirable that these filling materials be introduced into the secondary pressure chamber and that it be closed prior to the introduction of the plastic material therein.

I also find it advantageous to use in the primary pressure chamber a plastic material containing little or no fillers in order that it may have a high flow and great penetration to thoroughly impregnate and incorporate with the fibrous fillers within the secondary chamber or mold cavity.

It is also advantageous at times to incorporate with these and other fillers a suitable amount of hardening agent such as, for example, hexamethylenetetramine, where a synthetic resin of the phenol type is used, or catalytic materials of either a solid, gaseous or liquid nature such as other active methylene bodies capable of combining with furfural or, for that matter, various active accelerators such as, for example, in the case of a basic material, potassium carbonate, and in the case of an acid material, oxalic acid. These products can be very readily impregnated, incorporated or mixed with the filler materials within the mold cavity and will in this manner be thoroughly dispersed within the resinous mass after a resinous material has been introduced into the secondary chamber.

This permits me to utilize various cheap scrap materials to produce products of great strength.

While the secondary pressure chamber with its mold-forming cavities is designed to receive the pressure of the plastic material after such cavities have been closed, and while the pieces formed in such cavities and indicated in the drawings as B and B' fit snugly and while practically no fins are formed, the very nature of the method of forcing the material into these cavities under hydrostatic pressure, permits the ready and free escape of any unoccluded air or extraneous gaseous material, thus permitting a molded article to thoroughly fill the mold and permitting the more direct heat transfer to take place from the contacting metallic surfaces of the mold to the molding material. The air escapes very readily because at the beginning of the cycle the air is forced out ahead before the plastic material has an opportunity to close or dam up in minute openings present in the mold structure. The elimination of air and gas hastens the curing and setting of molded pieces very materially. Actual experiments have demonstrated that a product which will cure in say, one and one-half minutes, where the unoccluded air and gas has been permitted to escape freely, may require a curing time of two or even three minutes under conditions where the molding material has closed up the mold vents and openings before the air and gases within the mold cavity have had an opportunity to escape. Simply stated, the air and gas retards the heat conductivity of the molded plastic mass.

My method of molding by the transmission of a hydrostatic pressure through the medium of the plastic material itself permits me to produce molds for this method at a greatly reduced cost and to use various relatively soft materials for the cavity-forming portions, as no rigid mechanical pressure is applied to these. This enables me to use molds made of various cementitious materials, such as plaster of Paris, synthetic resins, and other materials of a similar type, and, when only a few reproductions are needed, I may even utilize wood or other fibrous materials. Of course, in the case of products of this type where the plastic molding material is likely to adhere to the mold itself, it is necessary to either line the contacting surfaces with a metallic coating such as a foil or deposit, or for that matter, to use a separating film such as for example, a sprayed coating of a solution of cellulose acetate. Where this cellulose acetate solution, however, is used, it will be found that it may adhere to the molded pieces and that a new coating of this solution will be necessary each time that a reproduction is made. However, as the coating is extremely thin and dries practically instantly, this is no serious objection.

On the other hand, for molds requiring a great many reproductions I am enabled to use the softer metals such as for example, lead, tin or alloys of these, zinc, brass, unhardened steel, or steel which has merely been case hardened or plated. As there is relatively very little motion taking place under pressure while the mold is being filled with plastic material, friction is of no serious consequence, and I might say that there is just enough motion to cause that beneficial polishing action necessary to keep the surfaces of molds in a brilliant, smooth condition. It will be found that under my method of operation the molds will not readily acquire a stained appearance but that the polish and brilliancy of the mold will be improved with use.

The drawings being merely illustrative of certain examples, while showing the multiple cavities of the secondary pressure chamber as being arranged on a horizontal plane, it is to be understood that for certain classes of work, as in the production of rings, disks, etc., I may advantageously superimpose the molds in a vertical plane.

My method of molding provides a uniform predetermined pressure of a positive hydrostatic type throughout and within each and all of the mold cavities and therefore a properly molded replica of the mold cavity is bound to be formed because my process provides the essence of material pressure and heat under the most ideal and favorable conditions.

It is to be noted that the primary pressure chamber is provided with substantially parallel sides between which the plunger fits closely. This is done to enable me to produce a positive hydrostatic pressure within the primary pressure chamber which is likewise transferred to the secondary pressure chamber forming the mold cavity, and that by this construction, I am enabled to positively provide the desired pressure within the mold cavity.

It is also to be noted that the secondary pressure chamber forming the mold cavity is so designed that pressure introduced therein from the primary pressure chamber will be retained thereby and that substantially no material will be allowed to escape from the mold-forming cavity. It will be readily understood that if this mold-forming cavity were open or if openings were purposely placed therein, it would not be possible to obtain an equilibrium in pressure between that present in the primary pressure chamber and induced in the secondary pressure chamber.

I wish to lay particular stress on the fact that the thin stream of plastic material coming in contact with the hot narrow passage is thoroughly and uniformly heated to any degree which such plastic material may require for the particular technical effect desired. It might be stated furthermore, that the drawings do not fully illustrate the actual dimensions of this passage and therefore let it be said that for the production of small articles such as barrels and caps for fountain pens, the area of the passage is only about 3/1000 of a square inch. Of course, in the case of larger articles this area may be made greater, but it is always preferable to keep it as small as possible in order to thoroughly heat the material. In the case of certain large work it is preferable to construct a mold cavity having several passages for the entrance of a plastic material. Under this condition the combined area of these passages is sufficient to permit the proper volume of material to flow within the mold cavity within the time limit required because of the reactivity or setting time of the material to be used. The use of relatively small passages enables me to cause these to break off readily at the junction or close to the junction of the molded piece. In order to add strength, however, it is usually preferable to have the passage terminating at the primary pressure chamber somewhat wider in order to insure that the material will not break off at this junction point.

The method of molding is applicable to either the use of hand molds or molds of the automatic type; that is, where relatively few duplicate parts are to be made, the molding can be carried out with less expensive mold equipment, and on the other hand, the method is just as applicable for the production of molds of the automatic type where a large number of duplicate parts are needed and the mold cost can for that reason be greater.

My molding method is applicable for the production of various molded pieces for use in the chemical, electrical and the mechanical arts. It is possible by my method to produce products of the laminated type either in the form of sheets, rods or tubes, with the assurance that a uniform pressure will be applied and the uniformity of dimensions will be maintained. This is not possible at the present time. My method is also applicable for the production of sound records, printing plates, etc., where the use of more or less fragile molds is required and which therefore insures a long life to these molds because of the plastic pressure employed. It might be stated also that certain large work such as for example, beds, bedsteads, furniture, etc., which it is practically impossible to mold by the usual methods, can be molded with an exactitude and certainty of results as it is possible to provide any number of passages for the material and the molds may be filled as quickly as the particular material in hand requires, and at the same time, permits the introduction of various filling materials, as before stated.

It is even possible to insert fillers of a previously woven or shaped form, such as hollow tubes, rods, etc., in order to properly reenforce the molded structure. It might be stated that the molding of very large pieces by the usual positive pressure or flash type of dies has been a bar to the production of molded pieces of unusually large size. Where pieces of large size are molded it is not necessary that the secondary pressure chamber be clamped in a hydraulic press as it is only necessary that such chamber communicate with and receive the material under pressure from the passage or passages of the primary pressure chamber, and that for this reason a relatively small hydraulic press may be made to produce relatively large pieces.

Innumerable advantages accrue, as will be evident from reading the preceding matter, but some of the advantages will be mentioned in the following paragraphs and the molding of synthetic resin plastics will be taken as a basis for these remarks.

In the molding of thermoplastic materials of the synthetic resin type the raw material comes to the molder in the form of a loose, dry powder, or in the form of rolled, compressed sheets. If the powdered material is to be used it is necessary that this be carefully weighed out and for certain classes of work the powder is altogether too bulky and must be put through a preliminary operation of compressing the powdered material into tablets of more or less uniform weight. As the tabletting machines, however, all operate on the basis of volume rather than weight, differences in the grinding of the powder in the mixture of the fine and coarse particles constituting such powdered compound cause variations in weight. Even when the powdered materials are compressed the volume is large, being from one and one-half to three times that of the finished molded article.

In molding work of this kind, by methods heretofore in use, two general types of molds have been employed. The first, known as the "open" or "flash" type, consists of two members with the molding cavity formed between them. In some instances the molding cavity must be equally divided owing to the shape of the piece, while in other instances, it may be wholly within the confines of one of the members, as in the case of a plain blank or disk. Be that as it may, however, in actual operation the mold must be opened and the raw material introduced into the mold cavity, the bulk of the material causing it to pile up above the surfaces. Each one of the multiple cavities of a die must be filled with its proper weight of material. The two members of the mold which are positioned relative to each other by means of guides or pins, are then placed between the platens of a press and squeezed together. This compresses the plastic material and so soon as it has softened sufficiently the material will commence to flow and if there is a proper uniformity of weight, flow and confinement, the results when the pieces are cured will produce a good replica from the mold cavity. If, on the other hand, the raw material has had too much flow or the tablets did not contain the right weight of raw material, defective casts will be produced. The flow is intended to be so proportioned that the restriction at the cut-off of the mold will just permit a sufficient amount of material to remain therein. Now when it is considered that this material is potentially reactive and that a cure is taking place at the cut-off edge it will readily be understood why it is not possible to properly close the molds to obtain pieces of predetermined dimensions. The overflow remains molded on as a fin and it is an extremely expensive process to remove the fins from the finished pieces in the majority of cases.

In the positive type of mold it is preferable to utilize only one cavity under one hydraulic press ram inasmuch as it is not possible to weigh out raw materials with such exactitude that a uniform pressure will be obtained on the material if more than one cavity is used. The use of a positive die, however, requires one of extremely sturdy construction, thoroughly hardened, inasmuch as it must stand the brunt of the full mechanical pressure exerted by the press ram. There is no provision made for the escape of air or occluded gas and the finished pieces will vary in dimension as the charge of material varies. Fins will be formed at the movable portions of the mold inasmuch as it is not possible to provide a close fit.

In either of the dies the molding conditions are such that the powerful mechanical pressure exerted between the mold faces and the plastic material caused by the closing of the mold and the compression of material therein causes powerful surges to take place within the mold cavity which tends to bend or break projectings pins, carries inserts out of line, etc. The maintenance cost on dies of this type is very high indeed and is due entirely to the brute force methods used in the production of molded pieces.

Molded pieces vary in strength because of variations in pressure during the formative period and also during the hardening cycle, and therefore, in the old methods of molding there is no assurance that a uniformity of strength can be maintained in the pieces.

While I have herein shown and described certain preferred forms of my invention, I wish it to be understood that I do not limit myself to all the precise details of the processes herein set forth by way of illustration, as modification and variation may be made without departing from the spirit of the invention or exceeding the scope of the appended claims.

What I claim is:

1. A transfer pressure method of molding potentially reactive infusibly thermosetting resinous material by the use of a closed mold and a pressure chamber in flow communication therewith, which includes placing solid potentially reactive infusibly thermosetting resinous material in the pressure chamber, heating and simultaneously subjecting the material to a positive pressure in order to plasticize the material progressively and to cause the same to flow from the pressure chamber to the mold until the mold is filled, continuing the application of said pressure on the material in the pressure chamber in order to hydrostatically apply pressure to the material in the filled mold and at the same time heating the material in the mold, the pressure and temperature in the mold being so controlled as to cause the material therein to rapidly react to its permanently set and infusible condition, the material being kept hot and under pressure throughout the molding operation.

2. A transfer pressure method of molding potentially reactive infusibly thermosetting resinous material by the use of a closed mold and a pressure chamber in flow communication therewith, which includes placing solid potentially reactive infusibly thermosetting resinous material in the pressure chamber, heating and simultaneously subjecting the material to a positive pressure in order to plasticize the material progressively and to immediately force such portions of the material as become plastic from the pressure chamber to the mold until the mold is filled, attenuating and heating the attenuated material during its passage to the mold, continuing the application of said pressure on the material in the pressure chamber in order to hydrostatically apply pressure to the material in the mold, and at the same time heating the material in the mold, the pressure and temperature in the mold being so controlled as to cause the material therein to rapidly react to its permanently set and infusible condition, the material being kept hot and under pressure throughout the molding operation.

3. A transfer pressure method of molding potentially reactive infusibly thermosetting resinous material by the use of a closed mold and a pressure chamber in flow communication therewith, which includes placing solid potentially reactive infusibly thermosetting material in the pressure chamber, heating and simultaneously subjecting the material to a positive pressure in order to plasticize an outer layer of the material and to immediately force the portions of the material which become plastic from the pressure chamber to the mold until the mold is filled, attenuating and further heating the attenuated material substantially to the point of reaction during its passage to the mold, continuing the application of said pressure on the material in the pressure chamber in order to cause the attenuated material to flow into the mold cavity before it has time to set and then to hydrostatically apply pressure to the material in the mold when filled, and so controlling the pressure and temperature in the mold as to cause the material therein to rapidly react to its permanently set and infusible condition, the material being kept hot and under pressure throughout the molding operation.

4. A transfer pressure method of molding potentially reactive infusibly thermosetting resinous material by the use of a closed mold and a pressure chamber in flow communication therewith, which includes placing solid potentially reactive infusibly thermosetting resinous material in the pressure chamber, heating and simultaneously subjecting the material to a positive pressure in order to plasticize the material and to force the plastic material from the pressure chamber to the mold until the mold is filled, continuing the application of said pressure on the material in the pressure chamber in order to hydrostatically apply pressure to the material in the mold and at the same time heating the material in the mold, the pressure and temperature in the mold being so controlled as to cause the material therein to rapidly react to its permanently set and infusible condition, the material being kept hot and under pressure throughout the molding operation, and then wholly emptying the apparatus of the reacted material preparatory to the next molding operation.

5. A transfer pressure method of molding potentially reactive infusibly thermosetting resinous material by the use of a closed mold and a pressure chamber in flow communication therewith, which includes placing solid potentially reactive infusibly thermosetting resinous material in the pressure chamber, heating and simultaneously subjecting the material to a positive pressure in order to plasticize the material progressively and to immediately force such portions of the material as become plastic from the pressure chamber to the mold until the mold is filled, attenuating and further heating the attenuated material during its passage to the mold, continuing the application of said pressure on the material in the pressure chamber in order to hydrostatically apply pressure to the material in the mold, the pressure and temperature in the mold being so controlled as to cause the material therein to rapidly react to its permanently set and infusible condition, the material being kept hot and under pressure throughout the molding operation, and then wholly emptying the apparatus of the reacted material to complete the molding cycle preparatory to the next molding operation.

6. A transfer pressure method of molding potentially reactive infusibly thermosetting resinous material by the use of a closed mold and a pressure chamber in flow communication therewith, which includes placing an individual charge of solid potentially reactive infusibly thermosetting resinous material sufficient for a single molding operation in the pressure chamber, heating and simultaneously subjecting the material to a positive pressure in order to plasticize the material progressively and to immediately force such portions of the material as become plastic from the pressure chamber to a heated mold until the mold is filled, continuing the application of said pressure on the material in the pressure chamber in order to hydrostatically apply pressure to the material in the mold and at the same time heating the mold, the pressure and temperature in the mold being so controlled as to cause the material therein to rapidly react to its permanently set and infusible condition, the material being kept under heat and pressure throughout the molding operation, and then wholly emptying the apparatus of the reacted material preparatory to the next molding operation.

Signed at New York, in the county of New York and State of New York this 18th day of September, A. D. 1928.

LOUIS E. SHAW.